3,099,633
EXTENDER COMPOSITIONS, ADHESIVE SOLUTIONS CONTAINING SAME AND PROCESS OF PREPARATION
Robert B. Black, Portland, Oreg., assignor to Agrashell, Inc., Los Angeles, Calif., a corporation of Delaware
No Drawing. Filed June 30, 1960, Ser. No. 39,814
15 Claims. (Cl. 260—17.2)

This invention relates to compositions of matter for use by fabricators of plywood and other laminated products for incorporation in synthetic resin glue solutions used in such industries. It also may be considered to relate to processes for improving the viscosity, wood penetration, bonding and other properties of synthetic resin adhesive solutions used in said fields, and to the resulting improved adhesive solutions.

As set forth in the copending applications Serial No. 425,051 and Serial No. 643,501, filed March 4, 1957, and now abandoned, having been replaced by application Serial No. 39,812, filed June 30, 1960, my associate Joseph W. Ayers has heretofore discovered that extender compositions composed of vegetable shell flour containing an addition of a minor amount of a finely divided, extracted lignin, either in unoxidized form or in oxidized form, can improve the properties of phenolic resin and other glue solutions when added thereto, by increasing the viscosity of the solution and decreasing the penetration of the glue into soft or porous surfaces of core woods. The addition of the extracted lignin in oxidized form produces exceptionally high grade plywood of the most varied construction (as to both thickness and number of veneers), even when the core wood is of low grade or rough stock. The compositions and solutions of the present invention may contain basically these same ingredients.

An immediate object of the present invention is to provide extender compositions and adhesive solutions containing the same which constitute improvements over said prior compositions and solutions particularly as to more effective and uniform application of the glue solution from the rapidly rotating rolls of the glue spreading machines used in plywood manufacture.

The overall object of the invention is to provide novel adhesive solutions containing new extender compositions, possessing to a unique degree all of the desirable properties for producing plywood of consistently high quality both as to strength and water-resistance, from all grades of wood including soft wood and non-uniform or rough cores, which properties include high glue viscosity and viscosity stability, uniform transfer and spreading from the applicator rolls, stability of film during assembly and lack of excessive penetration into wood pores.

The extender compositions of the invention to be sold to and used by the plywood industry are composed basically of (1) a vegetable shell flour, (2) a finely-divided extracted lignin preferably in oxidized form, and (3) a minor amount of a fiber-containing, high temperature, high pressure, hydrolyzation-degradation product of wood. A typical composition of the three ingredients is one containing 72 to 16 to 12 parts, respectively, by weight.

The vegetable shell flour used is exemplified by flours of nut shells, as those of English and black walnuts and pecans, and flours of fruit pit shells, as those of apricots and peaches.

The extracted lignin component hereinbefore mentioned is exemplified by the so-called "alkali lignin" produced as a by-product from wood pulping processes employing alkali, the most common procedure being known as the kraft process. Extracted lignins produced by biological and selective solvent action, as well as those prepared by chemical action can be employed, and in common the lignin products are free or substantially free of combined cellulosic constituents, wood sugars and other products of the wood or other ligno-cellulosic materials from which the lignin is obtained, and such extracted lignins are all soluble in alkali, apparently producing sodium lignate.

The lignin components of the oxidized lignins of applicant's compositions are both acid-insoluble and water-insoluble and are referred to as being "extracted," for they are products which have been separated from the wood or other lignocellulose material. Sulfonic acid derivatives, or lignin sulfonates, such as are obtained in the sulfite process of paper production being acid- and water-soluble are not included within the scope of said term. Only through the use of lignin in extracted form can the quality and the performance of the adhesive compositions of the invention be attained and maintained. To produce commercially acceptable results, experience has shown that it is essential that not only must the lignocellulose extender be of known constitution and uniform character, but also the oxidized lignin component must be of a definite and known quality.

Suitable extracted lignins are described in the booklet entitled "Indulin," issued by the West Virginia Pulp and Paper Co., Charleston, West Virginia (1951). Other suitable lignin products contemplated are disclosed in the booklet entitled "Commercial Lignins," by Robert S. Aries and Arthur Pollak, issued by the Northeastern Wood Utilization Council, New Haven, Connecticut (1949).

The oxidized lignin preferably used in the practice of the invention may be obtained by oxidation in neutral solution, in alkaline solution or, under certain circumstances, in an acid solution, but it can also be accomplished electrolytically or by enzymatic action. Practically considered, the oxidation is accomplished under aqueous alkaline conditions simply by introducing oxygen into the aqueous alkaline suspension of the extracted lignin.

The oxidized extracted lignins are those extracted lignins hereinbefore described which have been oxidized to a point where they impart an increased viscosity of practical effect to aqueous glue solutions in which they are incorporated. The oxidation effected imparts stability to glue solutions to which the oxidized lignin has been added, by preventing loss of glue at the glue lines due to excessive penetration into the pores of the surfaces of the plies during curing. This retention of viscosity during heating to the setting temperature and the prevention of excessive flow into the pores constitutes the primary advantage of the presence of the extracted lignin in the the oxidized condition. Oxidation to an extent providing any appreciable degree of viscosity increase in the aqueous suspension improves the retention at the glue line.

As is indicated in the hereinbefore mentioned Indulin booklet (page 18), the oxidation may be effected satisfactorily by introducing oxygen into an alkaline solution in water or other solvent until about 1 to 7 mols of oxygen per mol of lignin (M.W. 840) has taken up. The alkalinity may be imparted by the addition of any alkali, suitably sodium hydroxide, in a quantity of from 1–16 mols per mol of extracted lignin. As is also pointed out in said booklet, the rate and extent of oxygen absorption is increased with increasing alkali content. If the oxidation is continued too long, the gel is advanced in structure too far, and drying and further processing becomes very difficult or practically impossible. Thus it is the practical problem of handling which limits the permissible amount of oxidation. In all instances, the oxidation is terminated, of course, before any drastic breakdown of the lignin molecules occurs and destroys their viscosity-imparting qualities.

An oxidized lignin found particularly effective was produced by concentrating a spent black cooking liquor obtained from a kraft paper process to provide a liquid containing 18 to 20% solids. Cooled carbon dioxide gas was then bubbled through the concentrated solution while said solution was being continuously circulated, to precipitate the lignin. Upon completion of the precipitation, the carbonated liquor was heated at a temperature close to boiling to bring about coagulation of the lignin. After being cooled, the coagulated liquor was separated by filtration and the lignin was purified by washing.

The washed cake was then repulped in water and sufficient sodium hydroxide was added to adjust the pH of the suspension to an approximate value of 9. Thereupon air was blown into the solution during vigorous agitation until oxidation had occurred, this result being determined by the viscosity increase of the suspension. After oxidation, the suspension was concentrated, filtered and dried, this latter result preferably being obtained by spray drying. The final product thus obtained can be described as a technically pure, oxidized, extracted alkali lignin.

The completion of the oxidation step in the above-described process was determined by a standardized test involving adding 60 grams of the oxidized product and 300 grams of distilled water to a 600 cc. beaker. The mixture in the beaker was then stirred for three minutes with an electric stirrer. Next a sodium hydroxide solution made up of 50 grams water and 2 grams of solid sodium hydroxide was added. The resulting mixture was then electrically stirred for a period of five minutes. Thereupon, the mass was adjusted to a temperature of 77° F. and allowed to stand at this temperature for fifteen minutes. At the end of this period, the viscosity was measured with a Brookfield viscosimeter equipped with a No. 4 spindle, at 6 r.p.m. The reading was 90,000 centipoises.

Using this test for the determination and control of the oxidation, oxidized extracted lignins operable for the purposes of the present invention have revealed viscosities as low as 5000 centipoises and viscosities much higher than the 90,000 centipoises reading.

In addition to the above defined oxidized, extracted alkali lignin, the invention contemplates the use of oxidized, extracted alkali lignins containing some thiolignin due to the presence of SH groups introduced into the lignin molecules by the action of sodium sulfide during cooking processes used in preparing paper by the sulfide process.

The fibrous wood degration product employed is producible by subjecting gum, pine or similar wood chips to a high temperature and pressure treatment in water until the lignin in the wood is partially released and decomposed thus producing a mass containing separated fibers, removing the water from the fiber mass and drying and grinding the same to powder form.

The preferred degradation product is produced as a by-product residue from the pressed fiberboard production industry and may be defined as the short-fiber waste product obtained when the cooked aqueous mass is fed to a screen where the fibrous mass for the most part is collected for pressing into boards and the water passes through the screen carrying with it the fine fiber content. This process is disclosed, for example, in the United States Patent No. 2,224,135, issued to Robert M. Boehm, the short fibers being referred to as "solid fines." For use in the present process and compositions, the short fibers are merely collected, dried and ground to a fine particle size.

A typical commercial wall board production process in which the short-fiber waste by-product is produced is effected by the following procedure:

Finely chipped pine wood is subjected to the action of steam under a pressure of approximately 600 lbs. for a period of about 45 seconds in a "gun" and then the mass is discharged and thereby exploded.

The exploded fibrous mass containing about 50% moisture is then spread on screens where the fibers are collected in mat form for pressing into a board, the water passing through the screen carrying with it a small percentage of the fine fiber material. This fine fiber mass is separated from the waste water by filtering and is dried, ground and classified to provide a product suitably of approximately −200 mesh.

In the extender compositions the amounts of the align component can be varied within a wide range, the practical range usually being 5 to 50% and the optimum range 15 to 20% based on the weight of the combination of the three components of the extender composition. As to the amount of degradation product utilizable, from about 5 to 30% usually gives beneficial results, and optimum results ordinarily are obtained when 10 to 15% is used, one of the optimum results being the formation of thixotropic glue solutions.

The three components to be combined to form the extender composition may be blended merely by mixing the same in finely divided form in a standard ribbon type blender until a homogeneous product is obtained.

The extender compositions hereinbefore described can be employed very advantageously with plywood glue solutions of conventional types which are generally aqueous aklaline emulsions of artificial resins. Under some conditions, the amount of alkali already in the glue solution is sufficient, but ordinarily the addition of caustic alkali or sodium carbonate in amounts somewhat in excess of that which reacts with the extender components improves the bonding quality of the glue solution. Although 5% of either or both of said alkali materials (calculated in relation to the amount of extender composition present) may be sufficient in some glue solutions, the amount may be increased to 15 to 20% or more, as to each of said alkaline materials.

Plywood fabricators obtaining the extender compositions hereinbefore described can produce the adhesive solutions of the invention by gradually adding such compositions to the water to be used for dilution of the resin to which has already been added the sodium hydroxide or other caustic alkali ordinarily employed, and the mixture is agitated until uniform fluidity is obtained, 20 to 30 minutes usually being sufficient. When sodium carbonate is to be employed, it is preferably introduced immediately after the extender composition has been added. The application of heat is not ordinarily required. Upon completion of the mixing operation the resin glue solution is added and the mass is again agitated for a few minutes or until a homogeneous mass is obtained.

The resin glue solutions in which the extender compositions are particularly effective may be described as aqueous colloidal solutions of thermosetting aldehydic resin glues. Such solutions are produced and sold by several companies (usually in solutions of 40–50 resin solids content) and their production constitutes no part of the present invention. The resins used include condensation products of phenolic compounds such as phenol, cresol, and resorcinol, or amino-compounds such as urea and melamine with an aldehyde, such as formaldehyde and acetaldehyde.

In the glue solutions produced in accordance with the present invention, conventional ratios of resin to extender composition to water can be employed. When conventional phenolic resin glue aqueous emulsions (about 40–50% solids) are employed the weight ratio of resin to extender to water is, suitably, 5/1/1.75. The ratio of extender and water in the compositions can be greatly increased to provide solutions having ratios of as high as 5/4/7, and such glue solutions are economically acceptable for the production of plywood of one type or another, but all of high grade.

In accordance with a modification of the invention, the extender compositions and adhesive solutions contain in addition to the oxidized lignin, also some plain or unoxidized extracted lignin, all or part of which may be in the form of sodium lignate, as "Indulin C." The unoxidized extracted lignin will ordinarily replace part of the oxidized extracted lignin in the compositions herein defined. The amount of the oxidized lignin which can be replaced by unoxidized lignin depends upon a number of factors including the grade or porosity of the wood and viscosity requirements of the glue solution. Displacement in greatest amounts is possible when plywood products of thin construction, as 3/16 inch, are being produced. From 5 to 75% of the oxidized lignin may be replaced by the unoxidized lignin (and/or the sodium lignate), and when thin plywood is fabricated, the displacement may reach as high as 90%.

In a special embodiment of the invention leading to the production of particularly high grade plywood, a minor or small amount of epoxy resin is incorporated in the compositions hereinbefore defined. The epoxy resin need be present in an amount as little as .4 to 1%, by weight, of the phenolic resin content to impart worth-while improvement in quality of the bond. Amounts as high as 20% can be used, but such higher amounts are now economically unfeasible. The epoxy resin is preferably introduced by preliminarily coating the shell flour particles with 2 to 7% resin, but such resin may be mixed in solution form with the phenolic resin solution. The epoxy resin used can be any of the commercial adhesive products such as may be produced by reacting bis-phenols or other polyhydroxy compounds with either of the usual chlorohydrins, epichlorohydrin or dichlorohydrin, specific examples of the same being disclosed in the hereinbefore mentioned copending application Serial No. 643,501. Other epoxy resins utilizable are disclosed in the book entitled "Epoxy Resins," by Henry Lee and Kris Neville published by the McGraw-Hill Book Company, Inc., New York, in 1957.

*Example 1*

Fifteen parts each of finely divided oxidized extracted lignin obtained by oxidizing a purified lignin by-product of the kraft paper-producing process and of a −200 mesh fiber-containing high temperature, high pressure degradation hydrolyzation product of pine wood, i.e., a ground fine fiber mass obtained by the steam pressure treatment of finely chipped pine wood as described hereinbefore in detail, were added to 85 parts of −325 mesh English walnut shell flour and blended in a dry mixer for about two minutes, a dry mix being obtained.

*Example 2*

In preparing an adhesive solution for use in producing plywood, 115 parts of the extender composition of Example 1 were added to 175 parts of water in which 20 parts of sodium hydroxide had been dissolved. Thereupon 25 parts of sodium carbonate were added and the mixture stirred for about 20 minutes. Next 500 parts of a conventional commercially obtainable phenol-formaldehyde plywood-glue in aqueous alkaline solution (viscosity G; solids content, 40.8%) were added and the resulting mass stirred for about 5 minutes, a viscous but free-flowing homogeneous mass being obtained.

*Example 3*

The procedures of Examples 1 and 2 were repeated except that the walnut shell flour used had been coated with 5% of an epoxy resin produced by the reaction of epichlorohydrin and 2,2-bis (parahydroxy phenol) propane in aqueous alkaline solution.

*Example 4*

The procedures of Examples 1 and 2 were repeated except that the amount of oxidized lignin was reduced to ten parts, and an equal amount of extracted lignin in plain or unoxidized form was added, half of the latter being in the form of its sodium salt.

The components of the extender compositions and the glue solutions herein referred to, other than the degradation product component are described in more detail along with additional examples, procedures and advantages in the hereinbefore mentioned prior applications.

The unique advantages of the present invention in relation to the inventions defined in said prior applications include:

More exact quantities of the glue can be spread and maintained on the surfaces of the veneers due to increased viscosity and thixotropic properties of the glue solutions.

The higher viscosity glues have less tendency to fly off the surface of the rapidly revolving spreader rolls of the glue applying machines.

More uniform plywood of higher quality is obtained, the superiority being outstanding, particularly as to plywood of thick construction or those containing soft, low grade or non-uniform core wood.

This application is a continuation-in-part of my copending application Serial No. 643,537, filed March 4, 1957, and now abandoned.

It should be understood that the invention is not limited to the specific details herein given, but that it extends to all equivalents which occur to those skilled in the art upon consideration of the scope of the claims appended hereto.

I claim:

1. A composition of matter for adding to and improving the viscosity, wood penetration, bonding and other properties of plywood adhesive and other laminating adhesive solutions which comprises a homogeneous mixture of a vegetable shell flour extender and minor amounts in finely-divided form of extracted lignin and of a lignocellulosic fibrous material, comprising lignin and separated wood fibers, resulting from the drying and grinding of fragmental solids produced by the hydro-thermal degradation of wood under superatmospheric pressure, at least 10% of said lignin being oxidized extracted lignin containing about 1 to 7 mols of added oxygen per mol of lignin.

2. A composition of matter for adding to and improving the viscosity, wood penetration, bonding and other properties of plywood adhesive and other laminating adhesive solutions which comprises a homogeneous mixture of a vegetable shell flour extender and minor amounts in finely-divided form of extracted lignin and of the short-fiber, by-product residue, comprising lignin and separated fine wood fibers, produced by the hydro-thermal degradation of wood under superatmospheric pressure and recovered from the water passed through the screen in pressed fiber-board production, at least 10% of said lignin being oxidized extracted lignin containing about 1 to 7 mols of added oxygen per mol of lignin.

3. A composition of matter for adding to and improving the viscosity, wood penetration, bonding and other properties of plywood adhesive and other laminating adhesive solutions which comprises a homogeneous mixture of a vegetable shell flour extender and minor amounts in finely-divided form of an extracted lignin in oxidized condition and containing about 1 to 7 mols of added oxygen per mol of lignin, and of a lignocellulosic fibrous material, comprising lignin and separated wood fibers, resulting from the drying and grinding of fragmental solids produced by the hydro-thermal degradation of wood under superatmospheric pressure.

4. The composition defined in claim 2 wherein substantially all of the extracted lignin is in oxidized condition containing about 1 to 7 mols of added oxygen per mol of lignin.

5. Plywood- and laminating-adhesive solutions comprising a thermosetting aldehydic resin glue selected from the group consisting of phenolic-aldehyde resins and amino-aldehyde resins in aqueous alkaline colloidal solution, a vegetable shell flour extender and minor amounts of extracted lignin and of a lignocellulosic fibrous material, comprising lignin and separated wood fibers, resulting from the drying and grinding of fragmental solids produced by the hydro-thermal degradation of wood under superatmospheric pressure, at least 10% of said lignin being oxidized extracted lignin containing about 1 to 7 mols of added oxygen per mol of lignin.

6. A plywood adhesive solution comprising a thermosetting aldehydic resin glue selected from the group consisting of phenolic-aldehyde resins and amino-aldehyde resins in aqueous alkaline colloidal solution, containing therein a vegetable shell flour extender and a minor amount of an alkali-dissolved, extracted lignin in oxidized condition and containing about 1 to 7 mols of added oxygen per mol of lignin, said solution having its viscosity increased and its wood penetration properties decreased by the presence of 5–30% of a lignocellulosic fibrous material, comprising lignin and separated wood fibers, resulting from the drying and grinding of fragmental solids produced by the hydro-thermal degradation of wood under superatmospheric pressure, said percentage being calculated on the amount of the mixture of the extender, the lignin and the hydrolyzation product.

7. Plywood- and laminating-adhesive solutions comprising a thermosetting aldehydic resin glue selected from the group consisting of phenolic-aldehyde resins and amino aldehyde resins in aqueous alkaline colloidal solution, a vegetable shell flour extender, free alkali and minor amounts of extracted lignin and of a lignocellulosic fibrous material, comprising lignin and separated wood fibers, resulting from the drying and grinding of fragmental solids produced by the hydro-thermal degradation of wood under superatmospheric pressure, at least 10% of said lignin being oxidized extracted lignin containing about 1 to 7 mols of added oxygen per mol of lignin.

8. The composition of claim 2 wherein the vegetable shell flour is coated with from .4 to 20% of an epoxy resin derived by the reaction of a polyhydroxy hydrocarbon with a compound selected from the group consisting of epichlorohydrin and dichlorohydrin, and containing free epoxy groups.

9. The adhesive solution of claim 5 wherein the resin is supplemented by an epoxy resin derived by the reaction of a polyhydroxy hydrocarbon with a compound selected from the group consisting of epichlorohydrin and dichlorohydrin, and containing free epoxy groups in a quantity of .4 to 20% based on the weight of the vegetable shell flour present.

10. A process for improving the viscosity, wood penetration, bonding and other properties of plywood and other laminating adhesive solutions consisting essentially of a thermosetting aldehydic resin glue selected from the group consisting of phenolic-aldehyde resins and amino-aldehyde resins in aqueous alkaline colloidal solution, a vegetable shell flour extender and a minor amount of extracted lignin, which comprises adding to said solution a minor amount of a finely divided, lignocellulosic fibrous material, comprising lignin and separated wood fibers, resulting from the drying and grinding of fragmental solids produced by the hydro-thermal degradation of wood under superatmospheric pressure, at least 10% of said lignin being oxidized extracted lignin containing about 1 to 7 mols of added oxygen per mol of lignin.

11. A composition of matter for adding to and improving the viscosity, wood penetration, bonding and other properties of plywood adhesive and other laminating adhesive solutions which comprises, a homogeneous mixture of a vegetable shell flour extender and minor amounts in finely divided form of an extracted lignin in oxidized condition and containing about 1 to 7 mols of added oxygen per mol of lignin, of an extracted lignin in unoxidized form and of a lignocellulosic fibrous material, comprising lignin and separated wood fibers, resulting from the drying and grinding of fragmental solids produced by the hydro-thermal degradation of wood under superatmospheric pressure.

12. Plywood- and laminating-adhesive solutions comprising a thermosetting aldehydic resin glue selected from the group consisting of phenolic-aldehyde resins and amino-aldehyde resins in aqueous alkaline colloidal solution, a vegetable shell flour extender and minor amounts of an extracted lignin in oxidized condition and containing about 1 to 7 mols of added oxygen per mol of lignin, of an extracted lignin in unoxidized form and of a lignocellulosic fibrous material, comprising lignin and separated wood fibers, resulting from the drying and grinding of fragmental solids produced by the hydro-thermal degradation of wood under superatmospheric pressure.

13. An extender composition for plywood adhesive solutions and the like, comprising a mixture of a major portion of walnut shell flour, 5 to 30% by weight of a finely divided fibrous residue, comprising lignin and separated wood fibers, resulting from the drying and grinding of fragmental solids produced by the hydro-thermal degradation of pine wood chips by hydrolyzation thereof under superatmospheric steam pressure, and at least 5% by weight of finely divided extracted lignin at least 10% of which is oxidized lignin containing 1 to 7 mols of added oxygen per mol of lignin.

14. An extender composition as claimed in claim 13, the particles of said residue being of minus 200 mesh in size.

15. An extender composition as claimed in claim 14, the particles of said walnut shell flour being of minus 325 mesh in size.

References Cited in the file of this patent

UNITED STATES PATENTS

| | | |
|---|---|---|
| 2,161,748 | Samaras et al. | June 6, 1939 |
| 2,506,486 | Bender et al. | May 2, 1950 |
| 2,507,465 | Ayers | May 9, 1950 |
| 2,669,522 | Othmer et al. | Feb. 16, 1954 |
| 2,781,328 | Ayers et al. | Feb. 12, 1957 |
| 2,878,197 | Baxter et al. | Mar. 17, 1959 |